United States Patent [19]

Mitsche et al.

[11] 3,878,125
[45] Apr. 15, 1975

[54] MULTIMETALLIC CATALYST COMPOSITE

[75] Inventors: Roy T. Mitsche, Island Lake; John C. Hayes, Palatine; Frederick C. Wilhelm, Arlington Heights; Richard E. Rausch, Mundelein, all of Ill.

[73] Assignee: Universal Oil Products Company, Des Plaines, Ill.

[22] Filed: Nov. 29, 1973

[21] Appl. No.: 420,336

Related U.S. Application Data

[60] Division of Ser. No. 287,322, Sept. 8, 1972, Pat. No. 3,821,185, which is a continuation-in-part of Ser. No. 214,396, Dec. 30, 1971, Pat. No. 3,702,293, which is a division of Ser. No. 34,539, May 4, 1970, Pat. No. 3,660,309.

[52] U.S. Cl. .............................. 252/441; 252/455 Z
[51] Int. Cl. ...................... B01j 11/78; B01j 11/40
[58] Field of Search ........... 252/455 Z, 466 PT, 441

[56] References Cited
UNITED STATES PATENTS

| | | | |
|---|---|---|---|
| 3,554,902 | 1/1971 | Buss | 252/466 PT |
| 3,660,309 | 5/1972 | Hayes et al. | 252/455 Z |
| 3,702,293 | 11/1972 | Hayes et al. | 252/455 Z |
| 3,718,578 | 2/1973 | Buss et al. | 252/466 PT |
| 3,790,473 | 2/1974 | Rausch | 252/466 PT |

Primary Examiner—C. Dees
Attorney, Agent, or Firm—James R. Hoatson, Jr.; Thomas K. McBride; William H. Page, II

[57] ABSTRACT

A catalytic composite, comprising a combination of catalytically effective amounts of a platinum or palladium component, an iridium component, and a Group IVA metallic component with a carrier material containing alumina and a finely divided, zeolitic crystalline aluminosilicate, is disclosed. A specific example of the catalytic composite disclosed herein is a composite containing 0.01 to 2 wt. % platinum or palladium, 0.01 to 2 wt. % iridium and 0.01 to 5 wt. % germanium, tin or lead combined with a gamma-alumina carrier material having 0.1 to 20 wt. % of the hydrogen form of mordenite uniformly distributed therethrough. Principal utility of these catalytic composites is, broadly, in processes for the conversion of hydrocarbons and, more particularly, in a process for the production of LPG and a high octane reformate.

15 Claims, No Drawings

MULTIMETALLIC CATALYST COMPOSITE

CROSS-REFERENCES TO RELATED APPLICATIONS

This application is a division of our prior, copending application Ser. No. 287,322 filed Sept. 8, 1972 and now U.S. Pat. No. 3,821,105 which in turn is a continuation-in-part of our prior application Ser. No. 214,396 filed Dec. 30, 1971 and now U.S. Pat. No. 3,702,293, which in turn is a division of our prior application Ser. No. 34,539 filed May 4, 1970 and now U.S. Pat. No. 3,660,309 all of the teachings of these prior application being specifically incorporated herein by reference.

The subject of the present invention is a novel catalytic composite which has an exceptional activity and resistance to deactivation when employed in hydrocarbon conversion processes that require a catalyst having a hydrogenation-dehydrogentaion function coupled with a selective cracking function. More particularly, the present invention relates to a class of catalytic composites containing a platinum or palladium component, an iridium component and a Group IVA metallic component combined with an alumina carrier material having a zeolitic crystalline aluminosilicate distributed uniformly therethrough, and to the use of these composites in the conversion of hydrocarbons.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as the metals or compounds of metals of Groups V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and the like reactions, to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin compounds is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conventiently defined for a given charge stock as follows: (1) activity is a measure of the catalyst's ability to convert hydrocarbon reactants into products at a specified severity level where severity level means the conditions used — that is, the temperature, pressure, contact time and presence of diluents such as $H_2$; (2) selectivity typically refers to the weight, volume or mole percent of the reactants that are converted into the desired product and/or products; (3) stability refers to the rate of change of the activity and selectivity parameters — obviously the smaller rate implying the more stable catalyst.

As is well known to those skilled in the art, the principal cause of observed deactivation or instability of these dual-function catalysts when they are used in a hydrocarbon conversion reaction is associated with the fact that coke forms on the surface of the catalyst during the course of the reaction. More specifically, in these hydrocarbon conversion processes, the conditions utilized typically result in the formation of heavy, high moldecular weight, black, solid or semi-solid, carbonaceous material which coats the surface of the catalyst reducing its activity by shielding its active sites from the reactants. In other words, the performance of this dual-function catalyst is sensitive to the presence of carbonaceous deposits on the surface of the catalyst. Accordingly, the major problem facing workers in this area of the art is the development of a more active and selective catalystic composite that is not as sensitive to the presence of these carbonaceous materials and/or have the capability to suppress the rate of the formation of these carbonaceous materials on the catalyst. Viewed in terms of performance parameters, the problem is to develope a dual-function catalyst having superior activity, selectivity and stability characteristics when employed in the particular hydrocarbon conversion process of interest.

We have now found a dual-function catalytic composite which possesses imporved performance characteristics when it is employed in a process for the conversion of hydrocarbons of the type which have heretofore utilized dual-function catalytic composites, such as processes for isomerization, hydroisomerization, dehydrogenation, hydrogenation, alkylation, dealkylation, cyclization, hydrocyclization, cracking, hydrocracking, reforming and the like processes. In particular, we have determined that the use of a catalyst comprising a combination of a platinum or palladium component, an iridium component and a Group IVA metallic component when combined with a carrier material containing alumina and finely divided zeolitic crystalline aluminosilicate enables the performance of hydrocarbon conversion processes utilizing dual-function catalysts to be substantially improved. Moreover, in the particular case of a reforming process, this novel catalyst is more active and allows the operation to be conducted at a lower average severity level. In addition, this catalyst allows a reforming process to be used to produce substantial quantities of LPG (i.e., liquified petroleum gas, $C_3+C_4$).

In brief summary, one embodiment of the present invention relates to a catalytic composite comprising a combination of catalytically effective amounts of a platinum or palladium component, an iridium component and a Group IVA metallic component, with a carrier material containing alumina and finely divided zeolitic aluminosilicate. The components are typically present in the composite in amounts sufficient to result in a final catalytic composite containing, on an elemental basis, about 0.01 to about 2 wt. % platinum or palladium, about 0.01 to about 5 wt. % Group IVA metal, and about 0.01 to about 2 wt. % iridium.

A second embodiment involves the catalytic composite described in the first embodiment wherein the zeolitic crystalline aluminosilicate comprises about 0.1 to about 20 wt. % of the carrier material.

A third embodiment concerns the catalytic composite described in the second embodiment wherein the zeolitic crystalline aluminosilicate is the hydrogen form of mordenite.

A fourth embodiment includes the catalyst composite described in the first embodiment wherein the zeolitic crystalline aluminosilicate is acid-extracted mordenite having a $SiO_2/Al_2O_3$ ratio substantially greater than 10:1.

Another embodiment comprehends a process for the conversion of a hydrocarbon comprising contacting the hydrocarbon and hydrogen with the catalytic composite described above in the first embodiment at hydrocarbon conversion conditions.

Still another embodiment is a process for the production of LPG and a high octane reformate wherein a gasoline fraction and hydrogen are contacted with the catalytic composite described in the first embodiment at LPG-production conditions.

Other embodiments of the present invention relate to details regarding essential, preferred and optional catalytic ingredients, preferred amounts of ingredients, suitable methods of catalyst preparation, operating conditions for use in the hydrocarbon conversion processes, and the like particulars. These are hereinafter disclosed in the following detailed discussion of each of these facets of the present invention.

The instant catalyst comprises a carrier material containing alumina and a zeolitic crystalline aluminosilicate having combined therewith a platinum or palladium component, an iridium component and a Group IVA metallic component. In addition, in some cases, the catalyst may contain a halogen component, or a sulfur component, or a Friedel-Crafts metal halide component. Considering first the alumina utilized in the present invention, it is preferred that the alumina be a porous, adsorptive, high surface area material having a surface area of about 25 to about 500 m²/g. Suitable alumina materials are the crystalline aluminas known as gamma-, eta-, and theta-alumina, with gamma-alumina giving best results. In addition, in some embodiments the carrier material may contain minor proportions of other well-known refractory inorganic oxides such as silica, zirconia, magnesia, etc. However, the preferred carrier material comprises substantially pure gamma-alumina containing a minor proportion of a finely divided zeolitic crystalline aluminosilicate.

It is an essential feature of the present invention that the carrier material contains a finely divided zeolitic crystalline aluminosilicate.

It is an essential feature of the present invention that the carrier material contains a finely divided zeolitic crystalline aluminosilicate. As is well known to those skilled in the art, crystalline aluminosilicates (also known as "zeolites" and "molecular sieves") are composed of a three-dimensional interconnecting network structure of silica and alumina tetrahedra. The tetrahedra are formed by four oxygen atoms surrounding a silicon or aluminum atom, and the basic linkage between the tetrahedra are through the oxygen atoms. These tetrahedra are arranged in an ordered structure to form interconnecting cavities or channels of uniform size interconnected by uniform openings or pores. The ion-exchange property of these materials follows from the trivalent nature of aluminum which causes the alumina tetrahedra to be negatively charged and allows the association with them of cations in order to maintain electrical balance in the structure. The molecular sieve property of these materials flows from the uniform size of the pores thereof which can be correlated to the size of the molecules that are present in a mixture of molecules and used to separate molecules having a critical diameter less than or equal to the pore mouths of these crystalline aluminosilicates. For the purposes of the present invention, it is preferred to use crystalline aluminosilicates having pore mouths of at least 5 Angstroms in cross-sectional diameter, and more preferably about 5 to about 15 Angstrom units. Ordinarily, the aluminosilicates are synthetically prepared in the alkali metal from with one alkali metal cation associated with each aluminum centered tetrahedra. This alkali metal cation may be thereafter ion-exchanged with polyvalent cations such as calcium, magnesium-beryllium, rare earth cations, etc. Another treatment of these alkali metal aluminosilicates involves ion-exchange with ammonium ions followed by thermal treatment, preferably about 300° F. to convert to the hydrogen form. When the crystalline aluminosilicates contain a high mole ratio of silica to alumina (for example, above 5:1), the material may be directly converted to an acid form in a suitable acid medium.

Although in some cases the polyvalent form of the alumino-silicate may be used in the present invention, it is preferred to use the hydrogen form, or a form — for example, the alkali metal form — which is convertible to the hydrogen form during the course of the hereinafter described preferred procedure for incorporation of the crystalline aluminosilicates in the carrier material.

The preferred zeolitic crystalline aluminosilicates for use in the present invention are the hydrogen and/or polyvalent forms of synthetically prepared faujasite and mordenite. In fact, we have found best results with sythetic mordenite having an effective diameter of about 6 Angstroms units and a mole ratio of silica to alumina of about 9:1 to 10:1, and more particularly, the hydrogen form of mordenite.

A particularly preferred crystalline zeolitic aluminosilicate is acid-extracted mordenite having an $SiO_2/Al_2O_3$ ratio substantially above 10:1. One method of forming this material involves subjecting the ordinary form of mordenite having a $SiO_2/Al_2O_3$ ratio of about 9:1 to 10:1 to the action of a strong acid such as hydrochloric acid, sulfuric acid, hydrofluoric acid, etc., at conditions effecting the removal or extraction of at least a portion of the aluminum from the mordenite. Typically, this procedure can be used to obtain mordenite having a $SiO_2/Al_2O_3$ ratio of about 11:1 to about 25:1 or more.

Regarding the method of incorporating the zeolitic crystalline aluminosilicate (hereinafter abbreviated to "CAS") into the carrier material, we have found that best results were obtained by adding the CAS directly into an aluminum hydroxyl chloride sol prior to its use to form the alumina carrier material. An advantage of this method is the relative ease with which the CAS can be uniformly distributed in the resulting carrier material. Additionally, the sol appears to react with the CAS causing some basic modification of the structure of the resulting material which enables it to have unusual ability to catalyze reactions which depend on carbonium ion intermediates such as cracking, alkylation, isomerization, polymerization, etc.

Accordingly, the preferred method for preparing the carrier material involves the following steps: forming an aluminum hydroxyl chloride sol by digesting aluminum HC1 to result in a sol having a weight ratio of aluminum to chloride of about 1 to about 1.4; evenly distributing the CAS throughout the sol; gelling the resultant mixture to produce a hydrogel or particles of a hydrogel; then finishing the hydrogel into the carrier material by standard aging, washing, drying and calcination steps. See U.S. Pat. No. 2,620,314 for details as to one preferred method of forming the resultant mixture into spherical particles.

The amount of CAS in the resulting carrier material is preferably about 0.05 about 75 wt. % and, more particularly, about 0.1 to about 20 wt. %. For reforming embodiments, it is preferred to use about 0.1 to about 2 wt. % CAS; on the other hand, for embodiments in which LPG production is to be maximized, it is preferred to use about 1 to about 10 wt. % CAS. By the expression "finely divided" it is meant that the CAS is used in a particle size having an average diameter of about 1 to about 100 microns, with best results obtained with particles of average diameter of less than 40 microns.

A preferred ingredient of the instant catalyst is a halogen component. Although the precise form of the chemistry of the association of the halogen component with the carrier material is not entirely known, it is customary in the art to refer to the halogen component as being combined with the alumina or with the other ingredients of the catalyst in the form of the halide (e.g., as the chloride). This combined halogen may be either fluorine, chlorine, iodine, bromine, or mixtures thereof. Of these, fluorine and particularly chlorine, are preferred for the purposes of the present invention. The halogen may be added to the carrier material in any suitable manner, either during preparation thereof or before or after the addition of the catalytically active metallic components. For example, the halogen may be added, at any stage of the preparation of the carrier material or to the calcined carrier material, as an aqueous solution of a suitable halogen-containing compound such as hydrogen fluoride, hydrogen chloride, hydrogen bromide, ammonium chloride, etc. The halogen component, or a portion thereof, may be combined with the carrier material during the impregnation of the latter with the platinum group component; for example, through the utilization of a mixture of chloroplatinic acid and hydrogen chloride. In another situation, the aluminum hydroxyl chloride hydrosol which is preferably utilized to form the carrier material inherently contains halogen and thus can contribute some portion of the halogen component to the final composite. In any event, te halogen is preferably combined with the carrier material in such a manner as to result in a final composite that contains about 0.1 to about 3.5 wt. % and more preferably about 0.5 to about 1.5 wt. % of halogen, calculated on an elemental basis. In isomerization or hydrocracking embodiments of the present invention, it is generally a good practice to use relatively larger amounts of halogen — up to about 10 wt. %.

A second essential ingredient of the subject catalyst is the platinum or palladium component. That is, it is intended to cover the use of platinum or palladium or mixtures thereof as a second component of the present composite. This platinum or palladium component may exist within the final catalytic composite as a compound such as an oxide, sulfide, halide, etc., in chemical combination with one or more of the other ingredients of the composite or as an elemental metal; however, best results are believed to be obtained when substantially all of this component is present in the metallic state. Generally, the amount of this component present in the final catalyst composite is small compared to the quantities of the other components combined therewith. In fact, the platinum or palladium component generally will comprise about 0.01 to about 2 wt. % of the final catalytic composite, calculated on an elemental basis. Excellent results are obtained when the catalyst contains about 0.05 to about 1 wt. % of platinum or palladium.

This platinum or palladium component may be incorporated in the catalytic composite in any suitable manner such as coprecipitation or cogellation, ion-exchange, or impregnation. The preferred method of preparing the present catalyst involves the utilization of a soluble, decomposable compound of platinum or palladium to impregnate the carrier material in a manner designed to result in a uniform dispersion of this component therethrough. For example, this component may be added to the support by commingling the latter with an aqueous solution of chloroplatinic or chloropalladic acid. Other water-soluble compounds of platinum or palladium may be employed in impregnation solutions and include ammonium chloroplatinate, bromoplatinic acid, platinum dichloride, platinum tetrachloride hydrate, platinum dichlorocarbonyl dichloride, dinitrodiamino-platinum, palladium chloride, palladium nitrate, palladium sulfate, etc. The utilization of a platinum or palladium chloride compound, such as chloroplatinic or chloropalladic acid, is preferred since it facilitates the incorporation of both the platinum or palladium component and at least a minor quantity of the preferred halogen component in a single step. Hydrogen chloride or the like acid is also generally added to the impregnation solution in order to further facilitate the incorporation of the halogen component and the uniform distribution of the metallic component throughout the carrier material. In addition, it is generally preferred to impregnate the carrier material after it has been calcined in order to minimize the risk of washing away the valuable platinum or palladium compounds; however, in some cases it may be advantageous to impregnate the carrier material when it is in a gelled state.

Yet another essential ingredient of the present catalytic composite is an iridium component. This component may be present in the composite as an elemental metal or in chemical combination with one or more of the other ingredients of the composite, or as a chemical compound of iridium such as the oxide, sulfide, halide, oxychloride, and the like. Best results are believed to be obtained when this component is present in the elemental metallic state. The iridium component may be utilized in the composite in any amount which is catalytically effective, with the preferred amount being about 0.01 to about 2 wt. % thereof, calculated on an elemental iridium basis. Typically best results are obtained with about 0.05 to about 1 wt. % iridium. It is, additionally, preferred to select the specific amount of iridium from within this broad weight range as a function of the amount of the platinum or palladium component, on an atomic basis, as is explained hereinafter. This iridium component may be incorporated into the catalytic composite in any suitable manner known to those skilled in the catalyst formulation art. In addition, it may be added at any stage of the preparation of the composite — either during preparation of the carrier material or thereafter — and the precise method of incorporation used is not deemed to be critical. However, best results are thought to be obtained when the iridium component is relatively uniformly distributed throughout the carrier material, and the preferred procedures are the ones known to result in a composite having this relatively uniform distribution. One acceptable procedure for incorporating this component into the composite involves cogelling or coprecipitating the iridium component during the preparation of the preferred carrier material, alumina. This procedure usually comprehends the addition of a soluble, decomposable compound of iridium such as iridium tetrachloride to the alumina hydrosol before it is gelled. The resulting mixture is then finished by conventional gelling, aging, drying and calcination steps as explained hereinbefore. A preferred way of incorporating this component is an impregnation step wherein the porous carrier material is impregnated with a suitable iridium-containing solution either before, during or after the carrier material is calcined. Preferred impregnation solutions are aqueous solutions of water-soluble, decomposable iridium compounds such as iridium tribromide, iridium dichloride, iridium tetrachloride, iridium oxalic acid, iridium sulfate, potassium iridochloride, chloroiridic acid and the like compounds. Best results are ordinarily obtained when the impregnation solution is an aqueous solution of chloroiridic acid or sodium chloroiridate. This component can be added to the carrier material, either prior to, simultaneously with or after the other metallic components are combined therewith. Best results are usually achieved when this compound is added simultaneously with the other metallic components. In fact, excellent results are obtained, as reported in the examples, with a one step impregnation procedure using an aqueous solution comprising chloroplatinic or chloropalladic acid, chloroiridic acid, hydrochloric acid and a suitable compound of the desired Group IVA metal.

Another essential constituent of the instant catalytic composite is the Group IVA metallic component. By the use of the generic term "Group IVA metallic component" it is intended to cover the metals and compounds of the metals of Group IVA of the Periodic Table. More specifically, it is intended to cover: germanium and the compounds of germanium; tin and the compounds of tin; lead and the compounds of lead; and mixtures of these metals and/or compounds of metals. This Group IVA metallic component may be present in the catalytic composite as an elemental metal, or in chemical combination with one or more of the other ingredients of the composite, or as a chemical compound of the Group IVA metal such as the oxide, sulfide, halide, oxyhalide, oxychloride, aluminate and the like compounds. Based on the evidence currently available, it is believed that best results are obtained when the Group IVA metallic component exists in the final composite in an oxidation state above that of the elemental metal, and the subsequently described oxidation and reduction steps, that are preferably used in the preparation of the instant composite, are believed to result in a catalytic composite which contains an oxide of the Group IVA metallic component such as germanium oxide, tin oxide, and lead oxide. Regardless of the state in which this component exists in the composite, it can be utilized therein in any amount which is catalytically effective, with the preferred amount being about 0.01 to about 5 wt. % thereof, calculated on an elemental basis. The exact amount selected within this broad range is preferably determined as a function of the particular Group IVA metal that is utilized. For instance, in the case where this component is lead, it is preferred to select the amount of this component from the low end of this range — namely, about 0.01 to about 1 wt. %. Additionally, it is preferred to select the amount of lead as a function of the amount of the platinum group component as explained hereinafter. In the case where this component is tin, it is preferred to select from a relatively broader range of about 0.05 to about 2 wt. % thereof. And, in the preferred case, where this component is germanium, the selection can be made from the full breadth of the stated range — specifically, about 0.01 to about 5 wt. %, with best results at about 0.05 to about 2 wt. %.

The Group IVA component may be incorporated in the composite in any suitable manner known to the art such as by coprecipitation or cogellation with the carrier material, ion exchange with the carrier material, or impregnation of the carrier material at any stage in its preparation. It is to be noted that it is intended to include within the scope of the present invention all conventional procedures for incorporating a metallic component into a catalytic composite, and the particular method of incorporation used in not deemed to be an essential feature of the present invention. However, best results are believed to be obtained when the Group IVA component is uniformly distributed throughout the carrier material. One acceptable method of incorporating the Group IVA component into the catalytic composite involves cogelling the Group IVA component during the preparation of the carrier material. This method typically involves the addition of a suitable soluble compound of the Group IVA metal of interest to the alumina hydrosol. The resulting mixture is then commingled with a suitable gelling agent, such as a relatively weak alkaline reagent, and the resulting mixture is thereafter preferably gelled by dropping into a hot oil bath as explained hereinbefore. After aging, drying and calcining the resulting particles there is obtained an intimate combination of the oxide of the Group IVA metal and alumina. One preferred method of incorporating this component into the composite involves utilization of a soluble, decomposable compound of the particular Group IVA metal of interest to impregnate the carrier material either before, during or after the carrier material is calcined. In general, the solvent used during this impregnation step is selected on the basis of its capability to dissolve the desired Group IVA compound without affecting the carrier material which is to be impregnated; ordinarily, good results are obtained when water is the solvent; thus the preferred Group IVA compounds for use in this impregnation step are typically water-soluble and decomposable. Examples of suitable Group IVA compounds are: germanium di-fluoride, germanium tetrafluoride, germanium monosulfide, tin dibromide, tin dibromide di-iodide, tin dichloride di-iodide, tin chromate, tin difluoride, tin tetrafluoride, tin tetraiodide, tin sulfate, tin tartrate, lead acetate, lead bromate, lead bromide, lead chlorate, lead chloride, lead citrate, lead formate, lead lactate, lead malate, lead nitrate, lead nitrite, lead dithionate, and the like compounds. In the case where the Group IVA component is germanium a preferred impregnation solution is germanium tetrachloride dissolved in an anhydrous alcohol. In the case of tin, tin chloride dissolved in water is preferred. Regardless of which impregnation solution is utilized the Group IVA component can be impregnated either prior to, simultaneously with, or after the platinum or palladium component and the iridium component are added to the carrier material. Ordinarily, best results are obtained when this component is impregnated simultaneously with the other metallic components. Likewise, best results are ordinarily obtained when the Group IVA component is germanium or a compound of germanium or tin or a compound of tin.

Regardless of which Group IVA compound is used in the preferred impregnation step, it is important that the Group IVA metallic component be uniformly distributed throughout the carrier material. In order to achieve this objective it is necessary to maintain the pH of the impregnation solution in a range material about 1 to about 7 and to dilute the impregnation solution to a volume which is substantially in excess of the volume of the carrier mmaterial which is impregnated. It is preferred to use a volume ratio of impregnation solution to carrier material of at least 1.5:1 and preferably about 2:1 to about 10:1 or more. Similarly, it is preferred to use a relatively long contact time during the impregnation step ranging from about one-fourth hour up to about one-half hour or more before drying to remove excess solvent in order to insure a high dispersion of the Group IVA metallic component on the carrier material. The carrier material is, likewise, preferably constantly agitated during this preferred impregnation step.

An optional ingredient for the catalyst of the present invention is a Friedel-Crafts metal halide component. This ingredient is particularly useful in hydrocarbon conversion embodiments of the present invention where it is preferred that the catalyst utilized has a strong acid or cracking function associated therewith — for example, an embodiment wherein hydrocarbons are to be hydrocracked or isomerized with the catalyst of the present invention. Suitable metal halides of the Friedel-Crafts type include aluminum chloride, aluminum bromide, ferric chloride, ferric bromide, zinc chloride and the like compounds, with the aluminum halides and particularly aluminum chloride ordinarily yielding best results. Generally, this optional ingredient can be incorporated into the composite of the present invention by any of the conventional methods for adding metallic halides of this type; however, best results are ordinarily obtained when the metallic halide is sublimed onto the surface of the carrier material according to the preferred method disclosed in U.S. Pat. No. 2,999,074. The component can generally be utilized in any amount which is catalytically effective, with a value selected from the range of about 1 to about 100 wt. % of the carrier material generally being preferred.

Regarding the preferred amounts of the metallic components of the instant catalyst, we have ascertained that it is a good practice to specify the amount of the Group IVA metallic component and of the iridium component as a function of the amount of the platinum or palladium component. The amount of iridium component is ordinarily selected so that the atomic ratio of iridium to platinum or palladium metal is about 0.1:1 to 2:1. Broadly, the amount of Group IVA metallic component should be sufficient to result in an atomic ratio of Group IVA metal to platinum or palladium metal falling within the range of about 0.05:1 to about 10:1. More specifically, it is a preferred practice to select this ratio from the following ranges for the individual Group IVA species: (1) germanium, about 0.3:1 to 10:1, with best results at about 0.6:1 to 6:1; (2) tin, about 0.1:1 to 3:1, with best results at about 0.5:1 to 1.5:1; and, (3) lead, about 0.05:1 to 0.9:1 with best results at about 0.1:1 to 0.75:1.

Regardless of the details of how the components of the catalyst are combined with the carrier material, the final catalyst generally will be dried at a temperature of from about 200° F. to about 600° F. for a period of from about 2 to 24 hours or more and finally oxidized at a temperature of about 700° F. to about 1,100° F. for a period of about 0.5 to 10 hours, and preferably about 1 to about 5 hours. This oxidation step is preferably performed in the presence of air having a minor amount of chloride and water present therein — typically, a mole ratio of $H_2O$ to HCl of about 20:1 to about 100:1.

It is preferred that the resultant calcined catalytic composite be subjected to a substantially water-free reduction prior to its use in the conversion of hydrocarbons. This step is designed to insure a uniform and finely divided dispersion of the metallic components throughout the carrier material. Preferably, substantially pure and dry hydrogen (i.e. less than 5 vol. ppm. $H_2O$) is used as the reducing agent in this step. The reducing agent is contacted with the calcined catalyst at a temperature of about 800° F. to about 1,200° F. and for a period of time of about 0.5 to about 10 hours or more effective to substantially reduce at least the platinum or palladium component to the elemental state. This reduction treatment may be performed in situ as part of a start-up sequence if precautions are taken to predry the plant to a substantially water-free state and if substantially water-free hydrogen is used.

Although it is not essential, the resulting reduced catalytic composite may, in many cases, be beneficially subjected to a presulfiding operation designed to incorporate in the catalytic composite from about 0.05 to about 0.5 wt. % sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide in a mole ratio of about 10:1 moles of $H_2$ per mole of $H_2S$, at conditions sufficient to effect the desired incorporation of sulfur, generally including a temperature ranging from about 50° F. up to about 1100° F. or more. It is generally a good practice to perform this optional presulfiding step under substantially water-free conditions.

According to the present invention, a hydrocarbon charge stock and hydrogen are contacted with a catalyst of the type described above in a hydrocarbon conversion zone at hydrocarbon conversion conditions. This contacting may be accomplished by using the catalyst in a fixed bed system, a moving bed system, a fluidized bed system, or in a batch type operation; however, in view of the danger of attrition losses of the valuable catalyst and of well-known operational advantages, it is preferred to use a fixed bed system. In this system, a hydrogen-rich gas and the charge stock are preheated by any suitable heating means to the desired reaction temperature and then are passed, into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion with the latter being preferred. In addition, it is to be noted that the reactants may be in the liquid phase, a mixed liquid-vapor phase, or in a vapor phase when they contact the catalyst with best results obtained in the vapor phase.

In the cases where the catalyst of the present invention is used in a reforming process or a process for the production of LPG and a high octane reformate, the conversion system will typically comprise a conversion zone containing a fixed bed of the catalyst type previously characterized. This conversion zone may be one or more separate reactors with suitable heating means therebetween to compensate for the endothermic nature of the reactions that take place in each catalyst bed. The hydrocarbon feed stream that is charged to this conversion system in the reforming and LPG-production embodiments will comprise hydrocarbon fractions containing naphthenes and paraffins that boil within the gasoline range. The preferred charge stocks are those consisting essentially of naphthenes and paraffins, although in most cases aromatics will also be present. This preferred class includes straight run gasolines, natural gasolines, synthetic gasolines and the like. On the other hand, it is frequently advantageous to charge thermally or catalytically cracked gasolines or higher boiling fractions thereof, called heavy naphthas. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a high boiling fraction commonly referred to as a heavy naphtha-- for example, a naphtha boiling in the range of $C_7$ to 400° F. In some cases, it is also advantageous to charge pure hydrocarbons or mixtures of hydrocarbons that have been extracted from hydrocarbon distillates — for example, straight-chain paraffins — which are to be converted to aromatics. It is preferred that these charge stocks be treated by conventional catalytic pretreatment methods to remove substantially all sulfurous, nitrogenous and water-yielding contaminants therefrom.

In other hydrocarbon conversion embodiments, the charge stock will be of conventional type customarily used for the particular kind of hydrocarbon conversion being effected. For example, in a typical isomerization embodiment the charge stock can be any isomerizable hydrocarbon-containing stock such as a paraffinic stock rich in $C_4$ to $C_8$ normal paraffins, a normal olefin-rich stock or a normal butane-rich stock, or a n-hexane-rich stock, a naphthene-rich stock, etc.

In hydrocracking embodiments, the charge stock will be typically a gas oil, heavy cracked ccle oil, cycle In addition, alkyl aromatics can be conveniently isomerized by using the catalyst of the present invention. Likewise, pure hydrocarbons or substantially pure hydrocarbons can be converted to more valuable products by using the catalyst of the present invention in any of the hydrocarbon conversion processes, known to the art, that use a dual-function catalyst.

In the reforming and LPG-production embodiments, an effluent stream is withdrawn from the conversion zone and passed through a condensing means to a separation zone, typically maintained at about 50° F. wherein a hydrogen-rich gas is separated from a high octane liquid product, commonly designated as an unstabilized reformate. Preferably, at least a portion of this hydrogen-rich gas is withdrawn from the separating zone and is then recycled through suitable compressing means back to the conversion zone. The liquid phase from the separating zone is then typically withdrawn and commonly treated in a fractionating system in order to recover LPG (i.e., liquified petroleum gas — $C_3$ and $C_4$) and other light ends and to produce a high octane reformate.

The conditions utilized in the numerous hydrocarbon conversion embodiments of the present invention are those customarily used in the art for the particular reaction, or combination of reactions, that is to be effected. For instance, isomerizable hydrocarbon isomerization conditions include: a temperature of about 32° F. to about 1,000° F.; and preferably about 75° to about 600° F., a pressure of atmospheric to about 1,500 psig.; hydrogen to hydrocarbon mole ration of about 0.5:1 to about 20:1, and an LHSV (calculated on the basis of equivalent liquid volume of the charge stock contacted with the catalyst per hour divided by the volume of conversion zone containing catalyst) of about 0.2 hr.$^{-1}$ to 10 hr.$^{-1}$. Reforming conditions are: a pressure of 0 to 1,000 psig. and preferably about 50 to 500 psig.; a temperature of about 800 to 1,100° F., a hydrogen to hydrocarbon mole ratio of about 1:1 to 20:1 and preferably about 5:1 to 10:1, and a LHSV of about 0.1 to 10 hr.$^{-1}$. Likewise, hydrocracking conditions include: a pressure of about 500 psig. to about 3,000 psig.; a temperature of about 400° F. to about 900° F.; a LHSV of about 0.1 hr.$^{-1}$ to about 10 hr.$^{-1}$; and hydrogen circulation rates of about 1,000 to 10,000 SCF per barrel of charge.

Conditions utilized in the embodiment of the present invention when substantial quantities of LPG and a high octane reformate are to be produced include: a pressure of about 400 to about 800 psig., a temperature of about 800 to about 1,050° F., a LHSV of about 0.5 to 5 hr.$^{-1}$ and a hydrogen to hydrocarbon mole ratio of about 1:1 to 10:1.

The following working examples are given to illustrate further the preparation of the catalyst composite of the present invention and the use thereof in the conversion of hydrocarbons. It is understood that the examples are intended to be illustrative rather than restrictive.

EXAMPLE I

Aluminum metal, having a purity of 99.99 wt. % is digested in hydrochloric acid to produce an aluminum hydroxyl chloride sol having a weight ratio of Al/Cl of about 1.15 and a specific gravity of 1.3450. An aqueous solution containing 28 wt. % HMT (i.e., hexamethylenetetramine) is made up and 700 cc. of the HMT solution is then added to 700 cc. of the sol to form a dropping solution. About 10 grams of the hydrogen form of mordenite in the form of a fine powder is added to the resulting dropping solution and uniformly distributed therein. Another portion of the mordenite is chemically analyzed and contains 11.6 wt. % $Al_2O_3$, 87.7 wt. % $SiO_2$ and 0.2 wt. % Na. Still another portion of the mordenite is analyzed for particle size distribution. The results show that 57.6 wt. % of the powder is between 0 to 40 microns in size and 82.1 wt. % of the powder is between 0 and 60 microns in size.

The dropping solution containing the dispersed mordenite is passed through a vibrating dropping head and dropped in discrete particles into a forming oil maintained at 95° C. The rate of vibration and the volumetric flow of dropping solution is set to produce finished spherical particles of about one-sixteenth inch in diameter. The dropped particles are aged in oil overnight (about 16 hours), separated from the oil and aged in an ammoniacal solution at 95° C. for about 3 hours. The aged spherical particles are then water washed to remove neutralization salts and dried. The particles are thereupon calcined at 600° C. for 4 hours in dry air to give a carrier material having an apparent bulk density of between 0.4 and 0.5 g/cc.

A measured amount of germanium tetrachloride is then dissolved in anhydrous ethanol. The resulting solution is then aged at room temperature until an equilibrium conditions is established therein. Another aqueous solution containing chloroplatinic acid, chloroiridic acid and hydrogen chloride is then prepared. The two solutions are then intimately admixed to prepare an impregnation solution containing the desired amounts of the metallic ingredients.

About 350 cc. of the carrier material is then placed in a stream — jacketed rotating vessel and about 250 cc. of the impregnation solution added thereto. The vessel is then heated and rotated until all the liquid solution is evaporated. The resulting catalyst particles are then subjected to an oxidation treatment in an air atmosphere containing HCl and $H_2O$ at a temperature of 1,025° F. for about 1 hour. The resulting catalyst particles are then analyzed and found to contain, on an elemental basis, about 0.375 wt. % platinum, about 0.375 wt. % iridium, about 0.75 wt. % chlorine, and about 0.5 wt. % germanium. In addition, the alumina carrier material is found to contain about 5 wt. % of the hydrogen form of mordenite.

EXAMPLE II

A portion of the catalyst produced by the method of Example I is placed in a fixed bed isomerization plant of conventional design. Substantially pure isopropylbenzene is used as the charge stock. The charge stock is commingled with about 8 moles of $H_2$ per mole of hydrocarbon, heated to about 480° C., and charged to the reactor containing the catalyst which is maintained at about a pressure of about 300 psig. Substantial conversion of isopropylbenzene to trimethylbenzene is obtained.

EXAMPLE III

Another portion of the catalyst of Example I is used to isomerize normal butane at a pressure of 300 psig., a temperature of 225°C., a hydrogen to hydrocarbon mole ratio of about 0.5:1 and a LHSV of about 1.0 hr.$^{-1}$. Substantial isomerization of n-butane to isobutane is noted at these conditions.

EXAMPLE IV

Another portion of the catalyst of Example I is subjected to a dry prereduction with hydrogen at a temperature of about 1,25° F. The resulting reduced composite is thereafter contacted with a sulfiding gas consisting of a mixture of $H_2$ and $H_2S$ having about 10 moles of $H_2$ per mole of $H_2S$ at a temperature of about 1,025° F. and for a period of time sufficient to incorporate about 0.1 wt. % sulfur in the resulting catalyst.

The resulting prereduced and sulfided catalyst is then loaded into a conventional continuous reforming system and subjected to a test designed to study its LPG production ability.

The charge stock utilized is a Kuwait naphtha having an API gravity of 62 at 60° F., an initial boiling point of 172° F., a 50% boiling point of 240° F., and an end boiling point of 362° F. Moreover, it contains an aromatic content of 9 vol. %, a naphthene content of 16 and a paraffin content of 75 vol. %. Conditions utilized are: a LHSV of 2 hr.$^{-1}$, a pressure of 600 psig., a hydrogen to hydrocarbon mole ratio of about 5:1, and a temperature sufficient to produce a $C_5+$ reformate having an octane number of about 95 F-1 clear.

For a catalyst life of about 10 BPP the average yield data are: hydrogen production, about 150 to about 250 SCFB; $C_1+C_2$ production, about 5 to 10 wt. % of feed, $C_3+C_4$ production about 25 to 35 wt. % of feed; and $C_5+$ yield, about 55 to 70 wt. % of feed.

The selectivity of the catalyst for LPG production is evidenced by the facts that most of the light gas make is LPG and that the LPG make is about 25 to 35 wt. % of the feed.

EXAMPLE V

A catalyst is prepared by a method analogous to that described in Example I except that the amount of the reagents used to incorporate the chlorine and mordenite components are adjusted to result in a final catalyst containing 0.375 wt. % platinum, 0.375 wt. % iridium, 0.8 wt. % chlorine, 0.5 wt. % germanium combined with a gamma-alumina support containing 0.5 wt. % of the hydrogen form of mordenite.

The resulting catalyst is then loaded into a model of a continuous, fixed bed reforming plant of conventional design. In this plant a heavy Kuwait naphtha and hydrogen are continuously contacted at reforming conditions: a liquid hourly space velocity of 1.5 hr.$^{-1}$, a pressure of 100 psig., a hydrogen to hydrocarbon mole ratio of 8.1, and a temperature sufficient of continuously produce a $C_5+$ reformate of 102 F-1 clear. It is to be noted that these are exceptionally severe conditions.

The heavy Kuwait naphtha has an API gravity of 60° F. of 60.4, an initial boiling point of 184° F., a 50% boiling point of 256° F., and an end boiling point of 360° F. In addition, it contains about 8 vol. % aromatics, 71 vol. % paraffins, 21 vol. % naphthenes, 0.5 wt. parts per million sulfur, and 5 to 8 wt. parts per million water. The F-1 clear octane number of the raw stock is 40.0.

The fixed bed reforming plant is made up of a reactor containing the catalyst, a hydrogen separation zone, a debutanizer column, and suitable heating, pumping, cooling and controlling means. In this plant, a hydrogen recycle stream and the charge stock are commingled and heated to the desired temperature. The resultant mixture is then passed downflow into a reactor containing the catalyst as a fixed bed. An effluent stream is then withdrawn from the bottom of the reactor, cooled to about 100° F. and passed to a separating zone wherein a hydrogen-rich gaseous phase separates from a liquid hydrocarbon phase. A portion of the gaseous phase is continuously passed through a high surface area sodium scrubber and the resulting sulfur-free and water-free hydrogen stream recycled to the reactor in order to supply hydrogen thereto, and the excess hydrogen over that needed for plant pressure is recovered as excess separator gas. The liquid hydrocarbon phase from the hydrogen separating zone is withdrawn therefrom and passed to a debutanizer column of conventional design wherein light ends are taken overhead as debutanizer gas and a $C_5+$ reformate stream recovered as bottoms.

The test run is continued for a catalyst life of about 20 barrels of charge per pound of catalyst utilized, and it is determined that the activity, selectivity, and stability of the present catalyst are vastly superior to those observed in a similar type test with a conventional commercial reforming catalyst which utilizes platinum as the sole metallic component. More specifically, the results obtained from the subject catalyst are superior to the platinum metal-containing catalyst of the prior art in the areas of hydrogen production, $C_5+$ yield at octane, average rate of temperature increase necessary to maintain octane, and $C_5+$ yield decline rate.

It is intended to cover by the following claims all changes and modifications of the above disclosure of the present invention which would be self-evident to a man of ordinary skill in the catalyst formulation art or the hydrocarbon conversion art.

We claim as our invention:

1. A catalytic composite comprising a combination of catalytically effective amounts of a platinum or palladium component, and iridium component and a Group IVA metallic component with an alumina carrier material containing about 0.1 to about 20 wt. % of finely divided zeolitic crystalline aluminosilicate.

2. A catalytic composite as defined in claim 1 wherein the platinum or palladium component is platinum or a compound of platinum.

3. A catalytic composite as defined in claim 1 wherein the platinum or palladium component is palladium or a compound of palladium.

4. A catalytic composite as defined in claim 1 wherein the Group IVA metallic component is germanium or a compound of germanium.

5. A catalytic composite as defined in claim 1 wherein the Group IVA metallic component is tin or a compound of tin.

6. A catalytic composite as defined in claim 1 wherein the Group IVA metallic component is lead or a compound of lead.

7. A catalytic composite comprising a combination of the catalytic composite defined in claim 1 with a catalytically effective amount of a halogen component.

8. A catalytic composite as defined in claim 7 wherein the halogen component is chlorine or a compound of chlorine.

9. A catalytic composite as defined in claim 1 wherein the composite contains, on an elemental basis, about 0.01 to about 2 wt. % platinum or palladium, about 0.01 to about 5 wt. % of Group IVA metal and about 0.01 to about 2 wt. % iridium.

10. A catalytic composite as defined in claim 1 wherein the zeolitic crystalline aluminosilicate is mordenite.

11. A catalytic comopsite as defined in claim 10 wherein the mordenite is in the hydrogen form.

12. A catalytic composite as defined in claim 10 wherein the mordenite is acid-extracted mordenite having a $SiO_2/Al_2O_3$ ratio substantially above 10:1.

13. A catalytic composite as defined in claim 1 wherein the alumina is gamma-alumina.

14. A catalytic composite comprising a combination of the catalytic composite defined in claim 1 with a sulfur component in an amount sufficient to incorporate about 0.05 to about 0.5 wt. % sulfur, calculated on an elemental basis.

15. A catalytic composite as defined in claim 1 wherein the alumina carrier material is prepared by uniformly distributing finely divided zeolitic crystalline aluminosilicate throughout an aluminum hydroxyl chloride sol, gelling the resulting mixture to produce a hydrogel and calcining the resulting hydrogel.

* * * * *